(12) United States Patent
Akilian et al.

(10) Patent No.: US 8,025,832 B2
(45) Date of Patent: Sep. 27, 2011

(54) METHOD FOR SHAPING SHEET THERMOPLASTIC AND THE LIKE

(75) Inventors: Mireille K. Akilian, Waltham, MA (US); Mark L. Schattenburg, Framingham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 12/227,419

(22) PCT Filed: May 24, 2007

(86) PCT No.: PCT/US2007/012424
§ 371 (c)(1), (2), (4) Date: May 4, 2009

(87) PCT Pub. No.: WO2007/139903
PCT Pub. Date: Dec. 6, 2007

(65) Prior Publication Data
US 2009/0302511 A1    Dec. 10, 2009

Related U.S. Application Data

(60) Provisional application No. 60/808,475, filed on May 25, 2006.

(51) Int. Cl.
*B29C 51/08* (2006.01)
(52) U.S. Cl. ........... 264/322; 264/544; 425/387.1; 425/384; 65/25.4; 65/25.2; 65/182.2; 65/182.4
(58) Field of Classification Search ........... 264/544, 264/322; 425/387.1, 384; 65/25.4, 25.2, 65/182.2, 182.4
See application file for complete search history.

(56) References Cited

U.S. PATENT DOCUMENTS

| | | | |
|---|---|---|---|
| 2,377,849 A | 6/1945 | Binkert et al. | |
| 3,607,186 A | 9/1971 | Bognar | |
| 4,200,446 A * | 4/1980 | Koontz | 65/25.3 |

(Continued)

FOREIGN PATENT DOCUMENTS

CN    1351576 A    5/2002

(Continued)

OTHER PUBLICATIONS

Wikipedia definition; http://en.wikipedia.org/wiki/Fluid_bearing.*

(Continued)

*Primary Examiner* — Joseph S Del Sole
*Assistant Examiner* — David N Brown, II
(74) *Attorney, Agent, or Firm* — Steven J. Weissburg

(57) ABSTRACT

Processes and apparati for shaping sheet glass or thermoplastic materials use force from a layer of a flowing fluid, such as air, between the sheet and a mandrel at close to the softening temperature of the thermoplastic. The shape is preserved by cooling. The shape of the air bearing mandrel and the pressure distribution of the fluid contribute to the final shape. A process can be conducted on one or two surfaces such that the force from the air layer is on one or two surfaces of the sheet. The gap size between the sheet and mandrel determines the pressure profile in the gap, which also determines the final sheet shape. In general, smaller gaps lead to larger viscous forces. The pressure profile depends on the shape of the mandrel, the size of the fluid gap and the sheet and the fluid supply pressure.

16 Claims, 10 Drawing Sheets

U.S. PATENT DOCUMENTS

| | | | |
|---|---|---|---|
| 5,693,112 A * | 12/1997 | Lesage et al. ................ 65/106 |
| 5,948,132 A | 9/1999 | Maltby, Jr. et al. |
| 6,096,428 A | 8/2000 | Jing et al. |
| 6,257,022 B1 | 7/2001 | Caplan et al. |
| 7,000,433 B1 | 2/2006 | Lisec |
| 7,207,193 B2 | 4/2007 | Xun et al. |
| 2005/0202208 A1 | 9/2005 | Kelly |

FOREIGN PATENT DOCUMENTS

| | | |
|---|---|---|
| JP | 1994-134887 | 5/1994 |
| WO | WO 00/69781 | 11/2000 |

OTHER PUBLICATIONS

International Search Report and Written Opinion for PCT/US2007/012424, mailed Jan. 23, 2008.

Devitt, Drew, "Glass Flotation for PV and FPDs," Semiconductor International, Sep. 1, 2009. (not prior art).

Jimenez-Garate, Mario A., Hailey et al., "Thermal forming of glass microsheets for x-ray telescope mirror segments", Applied Optics, vol. 42, No. 4, Feb. 1, 2003, p. 724-735.

Slocum, Alexander H., "Bearings without Mechanical Contact between Elements," Precision Machine Design, Chapter 9, p. 551, 580-585 (1992).

Mauch, Reiner H. et al., "Thin glass substrates for mobile applications," Inorganic Optical Materials II, Proceedings of SPIE, vol. 4201, p. 162-168 (2000).

Akilian, Mireille, and Schattenburg, Mark L., "Reducing the warp of sheet glass", Journal of the SID 18/3, p. 1-9 (2010). (not prior art).

Akilian, Mireille, and Schattenburg, Mark L., "A novel method of reducing the warp of sheet glass," SPIE Optifab Conference, Rochester, NY, May 2009. (not prior art).

Chinese Office Action dated Nov. 25, 2010 and English Translation thereof, from Chinese Pat. App. No. 200780018929.5, which is the Chinese National Phase of PCT/US2007/012424.

Japanese Office Action dated Jun. 21, 2011 and English Translation thereof, from Japanese Pat. App. No. 2009-512157, which is the Japanese National Phase of PCT/US2007/012424.

* cited by examiner

METHOD FOR SHAPING SHEET THERMOPLASTIC AND THE LIKE

RELATED DOCUMENTS

The benefit of U.S. Provisional application No. 60/808,475, filed on May 25, 2006, entitled THERMAL SHAPING OF THIN GLASS SUBSTRATES USING POROUS MEDIA, is hereby claimed, and the entire document is hereby incorporated by reference herein.

GOVERNMENT RIGHTS

This invention was made with Government support under Grant Nos. NAGS-12583 and NNG05WC14G awarded by NASA. The Government has certain rights in this invention.

BACKGROUND

Inventions disclosed herein pertain to shaping sheet glass and sheet thermoplastic materials through application of heat to soften the sheet and use of a fluid or gas to form it. As used herein, the term thermoplastic refers to any material whose viscosity changes as a function of temperature, including silicate glasses such as borosilicate glass and fused silica, and polymeric materials such as polymethyl methacrylate (PMMA).

Glass sheets are used in a wide range of applications, such as flat panel displays, hard disk drives, car windshields, decorative ornaments, and optics used in x-ray telescopes. Different applications require different tolerances on the final shape of the sheets. The flat panel display and space telescope industries require thin sheets to minimize weight, yet substrates used in such applications require tight tolerances on their thickness uniformity and surface flatness in order to meet the required specifications for each field.

In the case of liquid crystal flat panel displays, two glass sheets are separated by a small gap of less than 10 μm in thickness, whereby this gap is filled by the liquid crystal. In order to prevent display mura such as color mura or contrast mura and to impart good display performances such as uniform display, high contrast ratio, and wide viewing angle to the color liquid crystal display, one has to maintain the gap between the two glass sheets to be constant and uniform. This becomes a challenge when the glass sheets used have wavy surfaces which result in a variation in the gap size.

The shaping of glass and thermoplastic materials by applying heat and allowing the material to sag by gravity into a mold or mandrel is well known. This process is also known as slumping. The temperature of the workpiece is raised close to its softening point, and the heated sheet sags by gravity to conform to the shape of a mold, which can be of any general shape. Some methods use forces other than gravity, such as vacuum or a moveable plunger onto the surface of the thermoplastic sheet, to facilitate and accelerate the shaping process. In this process it is important that the mold be fabricated of a material which is able to withstand a temperature above the softening temperature of the sheet without damage or significant deformation. After the desired shape has been achieved, the sheet and mold are slowly cooled below the softening temperature of the sheet resulting in the solidification of the thermoplastic material into the desired shape.

Slumping onto mandrels of any shape and whose surface has been ground and polished to a desired tolerance can be used as a method to improve the surface flatness of thermoplastic sheets. Glass sheets manufactured using different processes, such as the float process, the fusion process and the slot-draw process, are commonly used as substrates for flat panel displays and space telescopes. The slot-draw and fusion processes have minimal or no contact between the glass sheet and any tools as the glass is formed. This is particularly important for the flat panel display industry because it eliminates the introduction of impurities or damage to the glass sheet, leaving its surface pristine and smooth and of a fire-polished quality.

Slumping such glass or thermoplastic sheets onto a mandrel to change the shape of the sheet or to improve its flatness can compromise the quality of the sheet's surface. Contact with the mandrel at the elevated temperatures required for the process of slumping can mar the surface of the sheet. The presence of dust particles and other particulate impurities or thin contaminant materials sandwiched between the sheet and the mandrel can result in ripples in the final surface of the sheet after slumping. The removal of all dust particles and contaminants from the surface of the mandrel and the thermoplastic sheet can be difficult in a manufacturing environment.

In some cases, the complete removal of dust particles, for example by thorough cleaning and use of a clean room environment, can result in fusion of the mandrel with the workpiece being formed. For example, see Ralf K. Heilmann et al., Novel methods for shaping thin-foil optics for x-ray astronomy, Proc. SPIE, Vol. 4496 (2001). Fusion of the mandrel with the workpiece can also result from a slumping procedure which is excessively long or proceeds at too high of a temperature. This problem is well known to practitioners of the art of glass and thermoplastic molding. For example, glass artisans commonly apply a thin coating to the mold made of a slurry of fine refractory particles to prevent sticking during slumping. For another example, thin coatings of organic release agents are commonly applied to molds during the forming of thermoplastic polymers to prevent sticking. For another example, graphitic release agents are commonly applied to molds used during the forming of glass automobile windshields. In all these cases, however, the coating's roughness and the aforementioned effects of particulates and other surface contaminants can compromise the figure and surface quality of the final product.

Inventions disclosed herein eliminate the deleterious effects of contact by the workpiece with the mandrel by introducing a thin film of moving fluid, such as air, between the sheet and the mandrel. The mandrel thus acts as a fluid bearing with the bearing fluid being a liquid or a gas. It is important to select a fluid that can withstand the high temperatures needed for the process, which temperatures must exceed the softening temperature of the thermoplastic material. For example, for the case of polymeric materials, the fluid may be water or oil. For the case of a borosilicate glass, the fluid may be a gas such as air or nitrogen.

It is also important that the gap between the mandrel and the sheet be controlled to a dimension that is larger than the typical maximum size of particulate impurities in the manufacturing environment. This condition allows the thin layer of fluid to envelop or absorb the impurity particles, thus preventing such particles or surface contaminants from transmitting forces between the mandrel and workpiece. The fluid layer also provides the required force to shape the surface of the glass or thermoplastic material.

A primary object of inventions disclosed herein is to overcome the aforementioned disadvantages of known processes used for shaping sheet glass or sheet thermoplastic materials.

Another object of inventions disclosed herein is to shape sheet glass or sheet thermoplastic materials on a fluid bearing by using the force from a moving layer of fluid, such as air sandwiched between the sheet and the reference mandrel. The fluid bearing can be made of porous material or of machined or fabricated materials.

SUMMARY

Inventions disclosed herein relate to processes and apparati for shaping sheet glass or thermoplastic materials by using the force from a layer of a fluid, such as air, sandwiched between the sheet and a mandrel. The shaping process is conducted at a temperature close to the softening point of the thermoplastic sheet when the system is in thermal equilibrium. The shape thus achieved by this process is preserved in the sheet by slow cooling down through the material's softening point. The shape of the air bearing mandrel is very important in controlling the final shape of the thermoplastic material; however, it is not the only controlling factor. The pressure distribution of the fluid sandwiched between the sheet and the mandrel is another important factor in controlling the final shape of the sheet.

A process of an invention hereof can be conducted on one surface of a sheet such that the force from the air layer is on one surface of the sheet. A process of an invention hereof can also be conducted on two surfaces of a sheet, such that the force from the air layer is on the two surfaces of the sheet. The two configurations provide different results on the glass or thermoplastic sheet being formed. Using such a process on both sides of a sheet is particularly useful in improving the flatness of the sheet if applied while the sheet is being manufactured in a continuous process, such as the fusion and slot-draw processes that are used to manufacture sheets for the flat panel display industry.

The size of the gap between the sheet and the mandrel is important in determining the pressure profile of the fluid that fills the gap. The pressure profile of the fluid sandwiched between the sheet and mandrel is another factor that determines the final shape of the sheet being formed. In general, smaller gaps lead to larger viscous forces imparted by the fluid inside the gap onto the sheet glass or thermoplastic material. The pressure profile depends on the shape of the mandrel, the size of the air gap between the mandrel and the sheet and the supply pressure of the fluid squeezed between the mandrel and the sheet. These principles will become more apparent from the following description of the preferred embodiments taken in conjunction with the accompanying drawings.

DETAILED DESCRIPTION

A thermoplastic material shaping process according to a present invention involves shaping sheets of thermoplastic material by using a layer of fluid such as air sandwiched between the sheet and a pre-shaped air bearing mandrel. The thermoplastic material must be heated to a temperature close to its softening point. For the case of glass, this temperature could typically range between 400° C. and 800° C. A furnace controls the temperature of the sheet, air bearing mandrel and shaping air, such that the process of shaping is conducted at close to thermal equilibrium.

Figure 1:
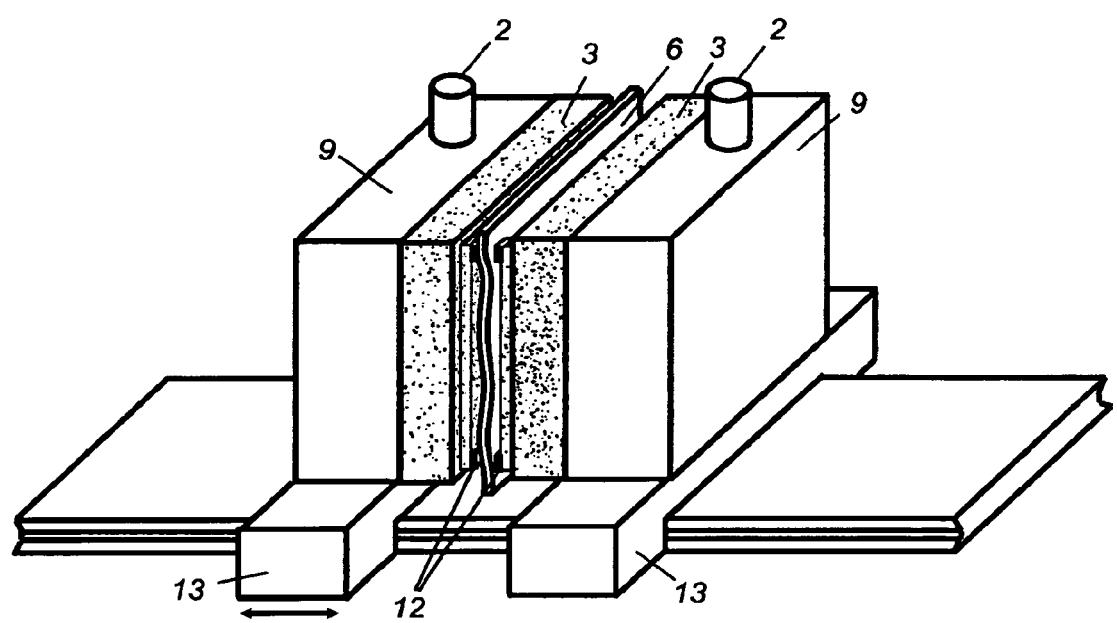
FIG. 1 is a perspective view of a vertical configuration which represents a first embodiment of an invention disclosed herein, where a thermoplastic sheet is squeezed between two mandrels while heated air blowing through the two mandrels shapes the surfaces of the sheet.
Figure 2:
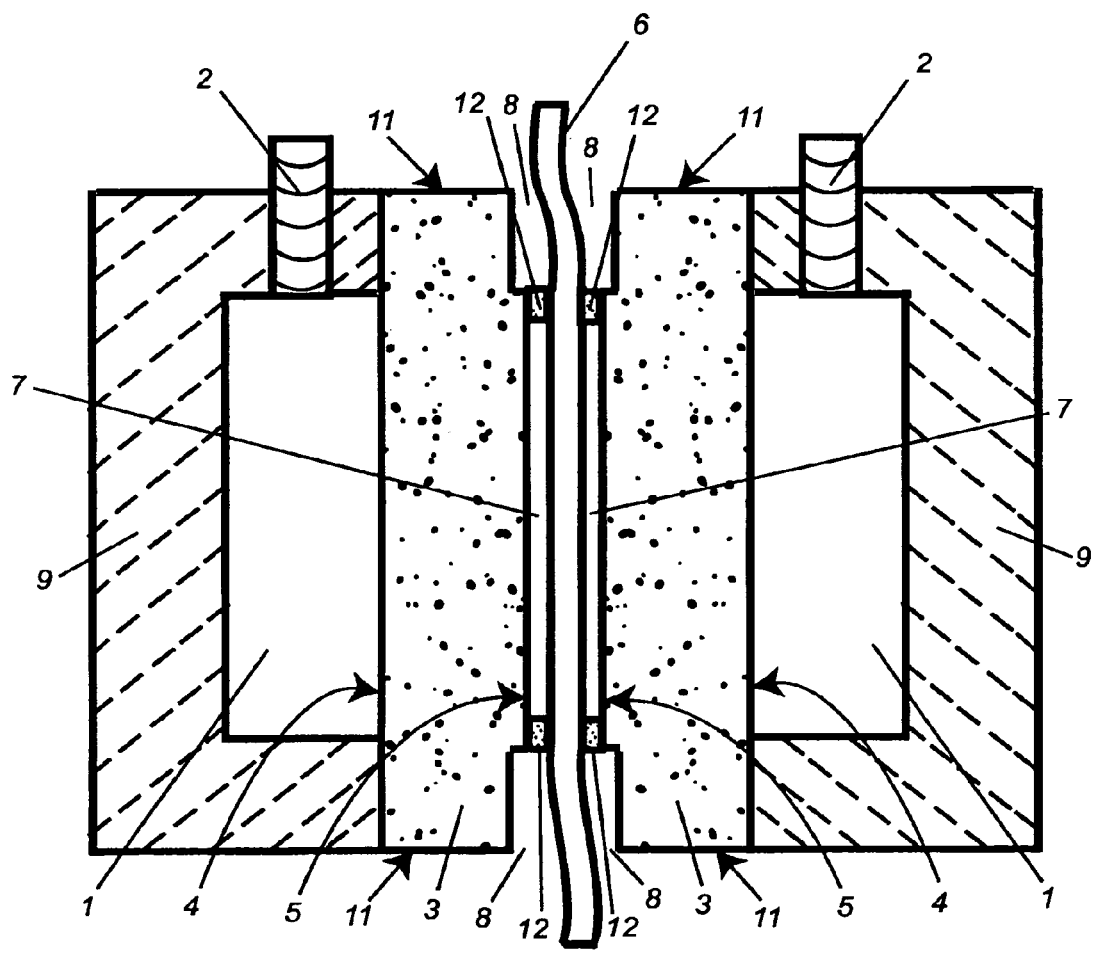
FIG. 2 is a sectional side view of the same embodiment as in FIG. 1, shown without the mandrel sliding mechanisms.

FIG. 1 shows a perspective view of a first embodiment, which places one sheet between two air bearings oriented in a vertical plane relative to gravity. FIG. 2 is a sectional view of the same embodiment depicted without the sliding bearing structure. The desired result is to improve the surface flatness of the glass or thermoplastic sheet 6. A preferred sheet material is the borosilicate glass Schott D263T, which is typically manufactured with a warp that is comparable to its thickness.

This embodiment is implemented in an apparatus that can accommodate one sheet at a time. The air bearing mandrels 3 can be made of ceramic or refractory materials although metals can be used as well. A preferred material is porous alumina ceramic. The mandrels 3 are made of a porous material whose front surfaces 5 have been ground and lapped to the flatness desired to be achieved by the glass or thermoplastic sheet 6 being processed. The side walls 11 of the porous material are sealed using a high temperature glaze to avoid air leakage.

One way to attach the ceramic mandrel 3 to the plenum structure 9 is through known methods of high temperature adhesive bonding, such as brazing or frit bonding. Use of a bolted joint or other types of mechanical fasteners is an option as well. It is preferable to complete the bonding of mandrel 3 to plenum 9 before conducting the front surface lapping process in order to avoid distortion due to bonding stresses and thereby achieve superior flatness.

In this embodiment a controlled gap 7 between sheet 6 and mandrels 3 is obtained by means of eight small precision spacers 12 of refractory material and equal thickness which are placed just inside the corners of sheet 6. The spacers 12 are assembled in pairs as shown in FIGS. 1 and 2 oriented on opposite sides of sheet 6 and between the mandrels 3 in order to hold sheet 12 in place during slumping. For example, when slumping glass sheets of dimension 100 mm by 100 mm, preferred spacers are preferably on the order of ten mm by ten mm and thus cover a small area of the sheet and do not impede the air squeezed between the sheet and mandrel from escaping to the atmosphere. The thickness of these spacers determines the size of the air gap 7 between each mandrel 3 and the sheet 6. For example, when slumping glass sheets, the preferred thickness of spacers 12 is between ten and twenty microns.

In this embodiment, the thermoplastic sheet can alternatively be constrained in place using other methods, such as suspending the sheet from the top. In this case the gap between the mandrels can be maintained by any precision mechanical assembly that is capable of holding a controlled and uniform gap between the surfaces of mandrels 3. While this approach results in a more complicated slumping apparatus, the advantage is that a larger proportion of the substrate will be obtained with improved flatness. In general, what is required is apparatus that holds the sheet 6 so that the extent of its surface desired to be formed is held spaced away from the mandrel surface, on one or both surfaces.

In a first embodiment of an invention, a process of shaping a glass sheet proceeds as follows. The mandrels 3 with affixed spacers 12 and without glass sheet 6 are placed on sliding bearings 13 in a furnace (not shown) in an open position. The slumping assembly is initially held at a temperature lower than the softening temperature of sheet 6 to be shaped. The still-solid sheet 6 is introduced between the two open mandrels 3 using mechanical means not shown, and the mandrels 3 are moved closer to each other using sliding bearings 13 until the four spacers 12 on each mandrel 3 contact sheet 6 and squeeze it in place between mandrels 3. Uniform contact force of spacers 12 onto mandrels 3 and glass sheet 6 can be achieved by means of precision mechanical design of and assembly of bearings 13, or by compliant mechanisms (not shown) which allow small horizontal and vertical rotations of at least one of the mandrels. This force must be larger than the force exerted by the pressurized air in the gap 7, which otherwise would result in the separation of the two mandrels from each other during the shaping process. Following the assembly and compression of the sheet 6 between mandrels 3, the temperature within the furnace is increased to the softening temperature of the sheet, at which point heated air is blown through the mandrels as described below. Alternatively, heated air can be blown through the mandrels before the aforementioned softening temperature is achieved.

Pressurized air is pre-heated and introduced into pressure plenums 1 through inlets 2. Air must be introduced at the same temperature and pressure through both mandrels 3 placed to the left and to the right of the thermoplastic sheet 6 to avoid thermal gradients and force variations on both sides of the thermoplastic sheet 6. For example, a difference in air temperature between the plenums 1 results in a temperature gradient across the thickness of the sheet 6 which in turn results in the bow of the sheet upon cooling. This thermal gradient can be implemented if a surface bow is a desired shape.

Air enters the porous air bearings at surfaces 4 and exits at surfaces 5. Porous material is preferred for the air-bearing mandrels in this embodiment because porous materials provide a relatively uniform pressure distribution in the gap 7 separating the mandrels 3 and the sheet 6 as compared to compensated bearings, described below. Mandrels 3 on opposite sides of thermoplastic sheet 6 must be identical to ensure force equality on both sides of the sheet. Lack of force equality can result in bowed sheets upon cooling.

Figure 3:
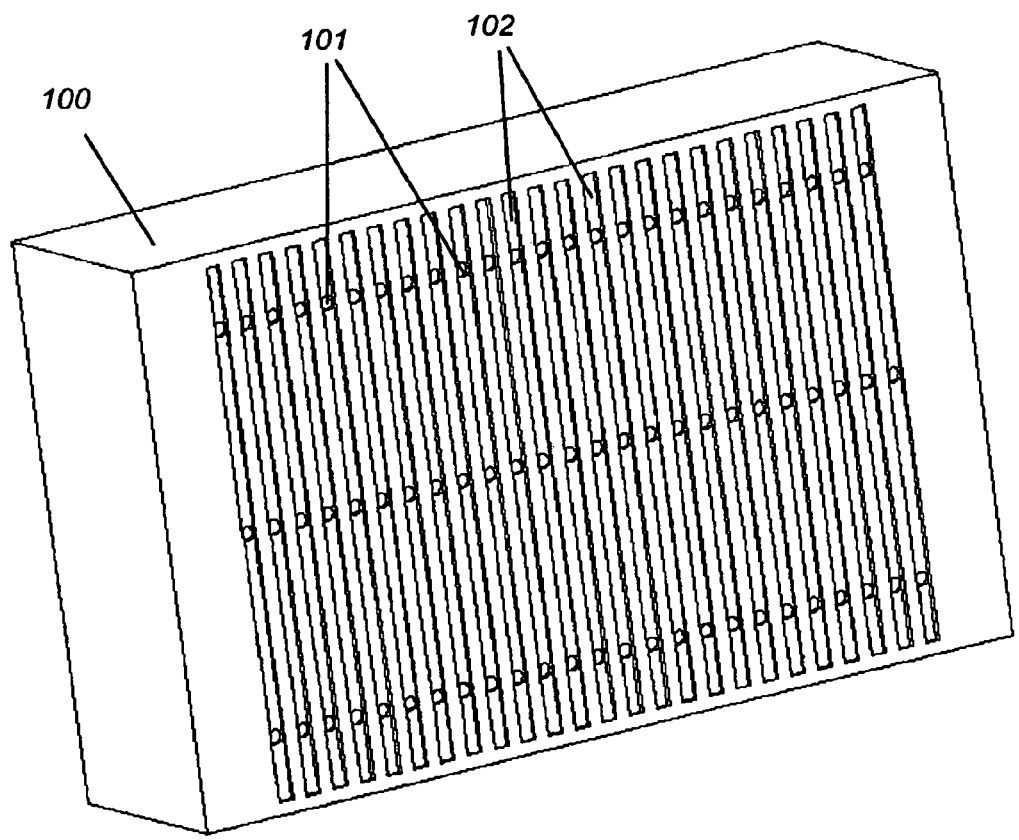
FIG. 3 is a perspective view of a mandrel with machined grooves.

Mandrels with different air diffusing mechanisms, also known as compensation methods, such as mandrels with holes machined into their surface or grooved mandrels with inlet holes and grooves, can be used as well. One configuration of such a mandrel is shown in FIG. 3. In this configuration, mandrel 100 has been fabricated with a plurality of holes 101 which provide a path for air to flow to sheet 6 from plenums 1. The flow of air is spread by a plurality of channels 102 fabricated into the surface of mandrel 100. Except for these details, the fabricated mandrel 100 performs the same function as porous mandrel 9.

Since this process is conducted when the thermoplastic sheet 6 is soft, the forces from air layers 7 can change the shape of sheet 6. The forces in the air layer result from the viscous flow of air layers 7 as they exit the porous mandrels 3 at surfaces 5 with a pressure greater than atmospheric and flow towards the edges 8 of the mandrels 3, where the pressure drops to atmospheric. Placing a second, identical mandrel on the opposite side of sheet 6 results in having an identical pressure supply on that side as well. This ensures the sheet is shaped in such a way that the forces on both sides of the sheet are balanced.

The forces from the air layers inversely depend on the gap thicknesses 7 between the mandrels 3 and the sheet 6 formed. At locations where this gap is relatively smaller, due to sheet initial waviness, the resulting forces from the air in the gap are relatively larger, and at locations where the gap is relatively larger, the forces are relatively smaller. This property is important in forming the sheet surface such that the surface flatness of the sheet 6 is improved. For an equal supply pressure in both plenums, force equilibrium is reached when the gap size on both sides of the sheet 6 is equal at any given point along the length of the sheet. As a result, the glass thermoplastic sheet surface waviness is reduced and its surface flatness improved as shown in FIG. 2. The edges of the glass sheet that are not exposed to the thin layer of air remain warped.

Once the sheet is shaped, the temperature of the furnace is slowly reduced until the sheet solidifies at which point the mandrels are slid apart and the sheet is removed and placed in another thermally controlled chamber where it is allowed to further cool. This process requires the thermal cycling of the mandrels with every sheet, which can be time consuming. A further embodiment, as described later, avoids the need for thermal cycling.

The wavy edges of the sheet, which are outside the area of influence of the thin pressured air layer 7, or are near the areas of contact with spacers 12, can be cut away to be left with the large central part of the sheet that was shaped by the thin layer of air 7. This shaping is achieved without compromising the quality of the sheet surface in the central area of the sheet that is cut away, which does not come in contact with any other surface throughout the process.

A basic requirement for this process in this embodiment is the flatness of the air-bearing mandrels themselves. The sheet will only be shaped to be as flat as the mandrels. Well known techniques such as grinding, lapping or diamond turning can be used to fabricate mandrels to the required flatness.

Another important factor to improving the surface flatness of a sheet is the thickness uniformity of the sheet before it is placed in the device. If a sheet is non-uniform in thickness, this process will at best improve the flatness of the sheet, such that it is equal to the thickness uniformity of the sheet. In most glass sheet manufacturing processes, the sheet thickness non-uniformity is at least one order of magnitude smaller than the waviness of the sheet. Therefore, this embodiment improves the surface flatness and reduces the waviness of glass or thermoplastic sheets such that the surface flatness becomes comparable in order of magnitude to the thickness non-uniformity of the sheet.

Thickness uniformity can be improved by the well known process of double-sided polishing of thin sheets. Surface waviness, on the other hand, can not be improved by the double-sided polishing process because of the sheet's tendency to spring back to its former, wavy shape after it has been removed from the double-sided polishing tool.

A person of ordinary skill in the art may recognize alternative versions of the first embodiment of this invention wherein the desired form of sheet 6 is a non-flat shape, such as a portion of a cylinder, sphere or paraboloid of revolution. In this case, opposing porous mandrels of matching convex and concave shapes conforming to the desired shape would be fabricated using known methods. Flat sheets 6 desired to be shaped into the non-flat shapes by the procedure of the first embodiment could first be formed into an approximation of the desired shape, for example, by preliminary slumping onto a non-air-bearing mandrel using conventional methods. These pre-shaped sheets can then be assembled and slumped on the air bearing mandrel apparatus using the procedure of the first embodiment, as described previously.

Figure 4:
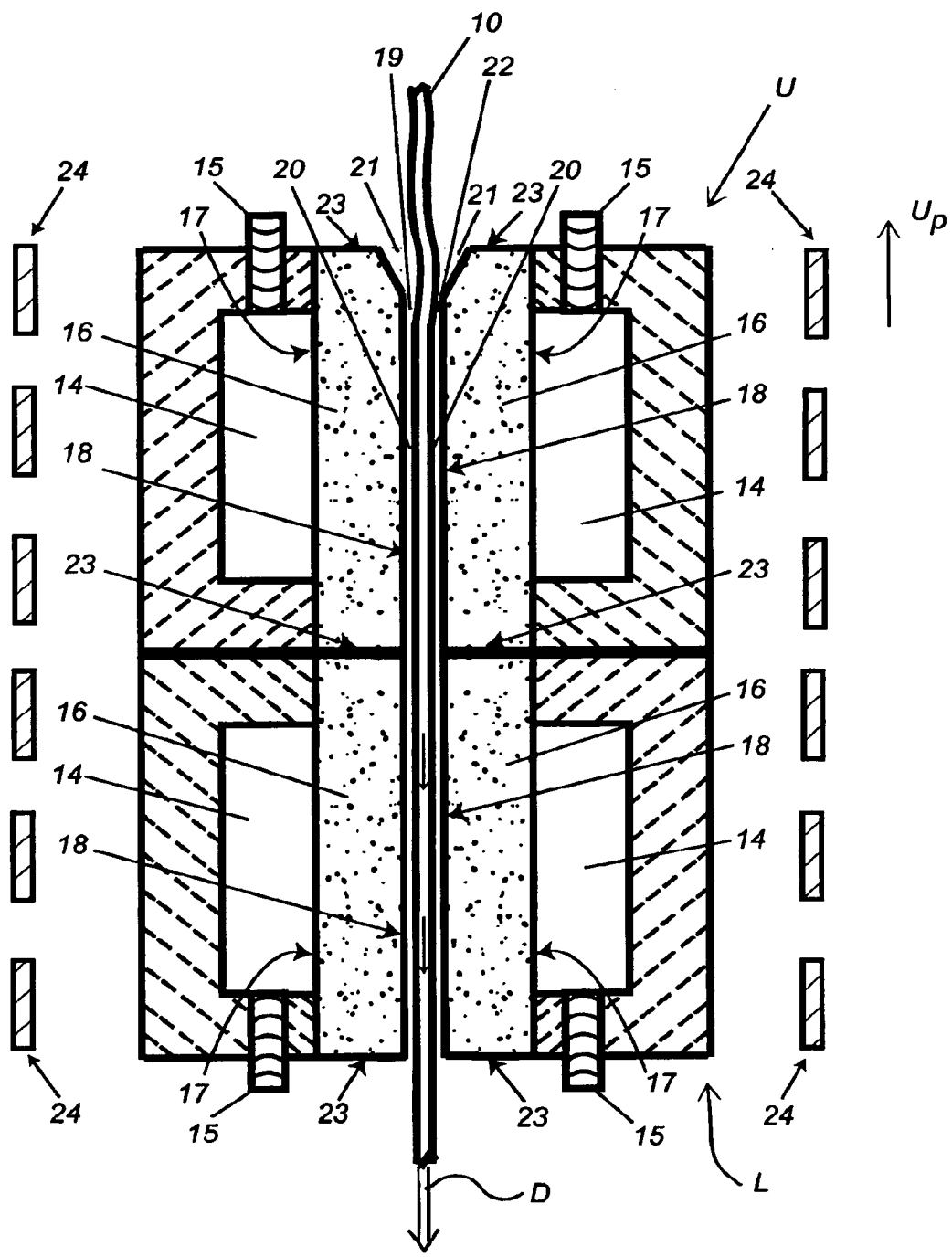
FIG. 4 is a side view of a vertical configuration which represents a second embodiment of an invention hereof, where two mandrels are placed on both sides of a wavy thermoplastic sheet, such as glass, while it is manufactured using a continuous process, in which heated air blows through the mandrels and against the glass sheet to shape it.

A second embodiment of an invention hereof is depicted in FIG. 4, wherein the desired result is to improve the surface flatness of a thermoplastic sheet as it is being manufactured using a continuous process, such as a slot-draw or a fusion processes for glass. This embodiment places sheet 10 and mandrels 16 in the vertical plane in which the glass sheet 10, in the form of a continuous ribbon (also called a string or film, depending on width, thickness, process, etc.), is moving downward, in the direction of arrow D, supported and moved along by conventional transport apparatus suitable for a continuous ribbon of such material, such as glass or thermoplastic, such as are used, for instance, in a fusion or slot-draw process. In general, a perpendicular line to a nominal point of the surface for this embodiment is horizontal with respect to gravity. In this embodiment, it is preferred that at the point of entry 21 of sheet 10 into the slot 20 between mandrels 16, sheet 10 is close to or slightly above the softening temperature of the sheet material. As the wavy sheet 10 moves downwards due to gravity during manufacturing, it is introduced into the gap between two opposing air-bearing mandrels 16 that are placed in the path of the moving glass. The top part of the first, upper set of mandrels U, is tapered at 21 to facilitate entry of glass sheet 10 between mandrels 16 where it will be shaped by the air in gap 20. The shaping process is similar to that described in the first embodiment, wherein air enters plenums 14 through inlets 15, and flows through surfaces 17 into mandrels 16. The thin layers of air 19, 22, squeezed between the moving sheet 10 and flat mandrels 16 shape the hot, soft glass to improve its flatness. The edges 23 of the mandrels are sealed, so that fluid does not escape therethrough, but rather exits through surface 18 into the gap 20.

This shaping process can be conducted at different sections of the sheet as it moves downwards while it is manufactured, such that the sections that are the highest and thus the closest to where the sheet is introduced are conducted at higher temperatures, and the lower sections L along the length of the moving sheet are conducted at lower temperatures until the thermoplastic sheet is cool enough to solidify and be transported outside of the air bearing to where, for example, it may be cut into segments. FIG. 4 shows only two such sections: the upper, hot one U for shaping the sheet and the lower, cooler one L where the sheet solidifies in its shaped form before exiting the mandrels. The number of thermally controlled sections can be varied to meet different requirements. Heating elements 24 can be used to control the temperature of the different sections along the length of the moving sheet 10.

Therefore, starting with a sheet that is uniform in thickness and following this embodiment of an invention produces better results in terms of reducing the said sheet's surface waviness.

The embodiment shown in FIG. 4 as described above can also be used to change the curvature of a flat sheet as it moves between the two mandrels by using curved mandrels. Two mandrels, such as opposing concave and convex mandrels, can be used to squeeze a thin sheet between them and shape the sheet to conform to the mandrels' surface geometry. The effect of sheet gravity sag can be corrected in the design of the mandrels.

Figure 5:
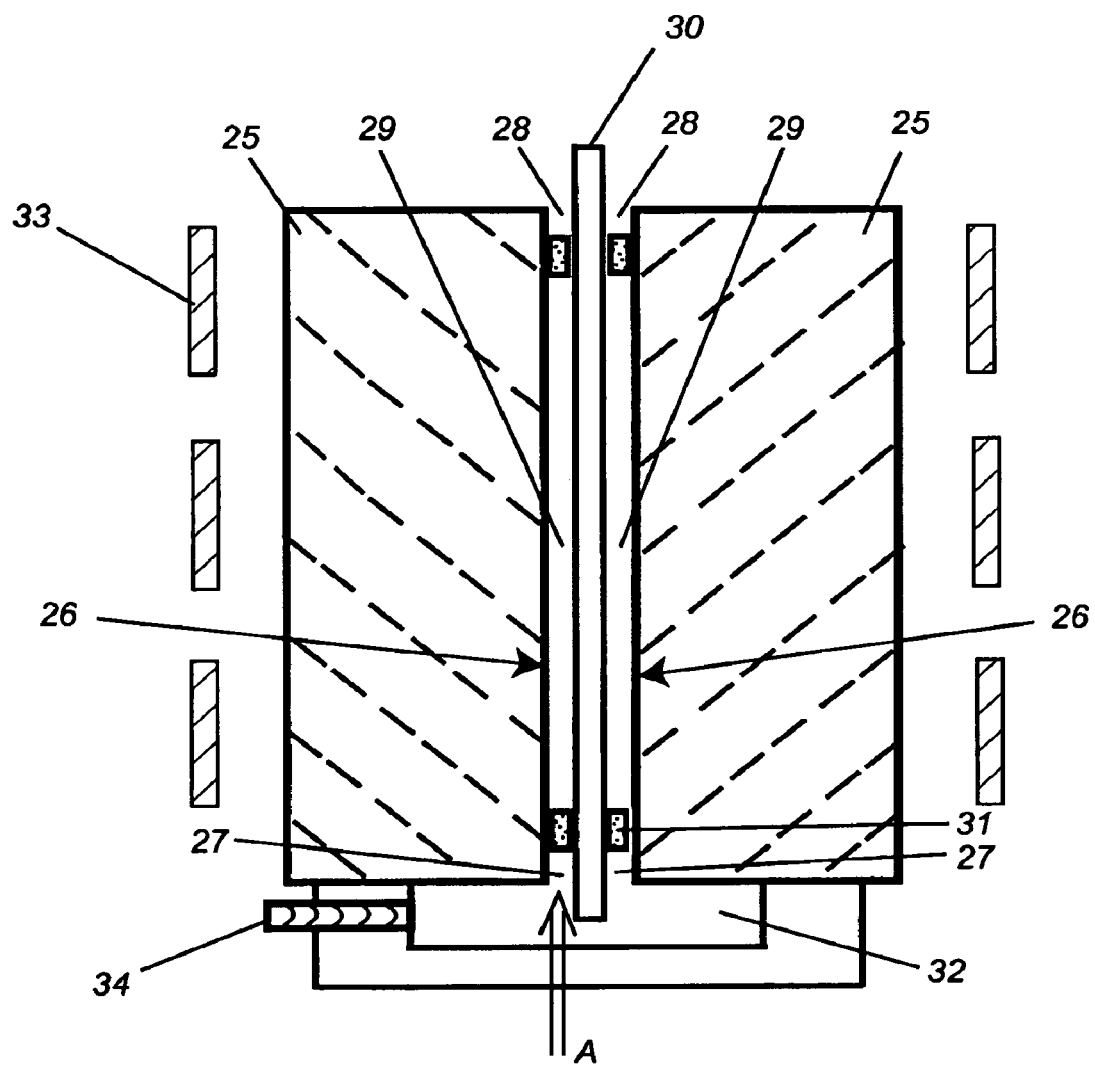
FIG. 5 is a side view of a vertical configuration of a third embodiment of an invention hereof, where two mandrels are placed on both sides of a glass or thermoplastic sheet and heated air is introduced from the lower end of the sheet, to flow parallel to the sheet, shape it and exit from the upper end.

A third embodiment, shown in FIG. 5, places sheet 30 and mandrels 25 also in the vertical plane relative to gravity (with a line that is perpendicular to a nominal point of the sheet surface being horizontal with respect to gravity). Non-porous mandrels 25 have their surfaces 26 ground and lapped to the desired flatness tolerance for forming thermoplastic sheet 30. In this embodiment the forming air flows from the lower end 27 of the thermoplastic sheet 30 to the upper end 28 of the sheet in the direction of arrow A. Air is introduced into the plenum 32 through the inlet 34 and enters between the sheet 30 and the mandrels 25 to shape the sheet. Heating elements 33 are used to control the temperature of the sheet. The sheet can be held in place with the surfaces spaced from the mandrel surfaces, 26, using spacers 31 or other mechanisms as explained in the first embodiment. Once the solid sheet 30 is constrained between the two mandrels 25, the temperature of the sheet 30 is increased to close to its softening point such that the viscous forces of the flowing air shape the two surfaces of the soft sheet 30. Once the desired shape is achieved the temperature is reduced as in the previous embodiments in order to solidify the sheet.

In this embodiment, the relationship between the air layer forces and thickness of the gap 29 is similar to that in the first embodiment. This property is important in shaping the sheet surface such that the surface flatness of the sheet 30 is improved. Both mandrel surface 26 flatness and sheet thickness uniformity are dominating requirements in this embodiment as well and must be well controlled to obtain better sheet flatness results.

All the embodiments described herein can be conducted with the forming workpiece oriented with its planar surfaces in a plane other than the vertical, for example when introducing curvature to the sheet surface; however, when rotated away from the vertical, the weight of the sheet becomes another critical parameter that must be taken into consideration when designing the mandrels and controlling the pressure profiles in the air gaps. In general, higher pressures in the gap 29 between mandrel 25 and sheet 30 tend to reduce the effects of gravity sag (for this embodiment and all others discussed above).

Figure 6:
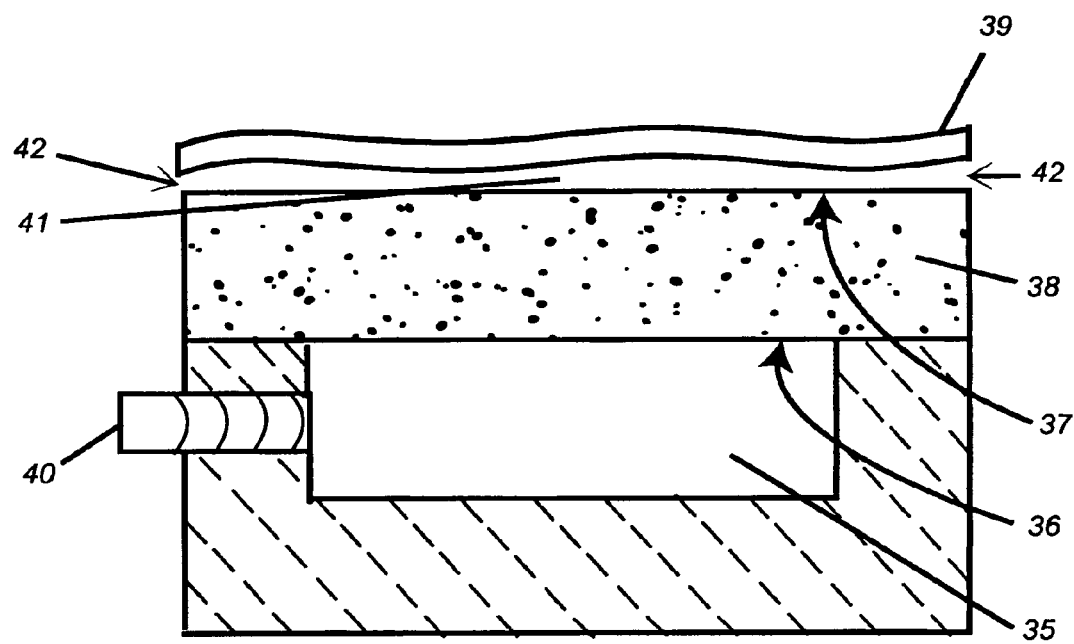
FIG. 6 is a side view of a horizontal configuration of a fourth embodiment of an invention hereof, where a thermoplastic sheet, such as glass, is placed on top of one flat mandrel with air blowing through the mandrel to carry the weight of the sheet and to shape it.
Figure 7:
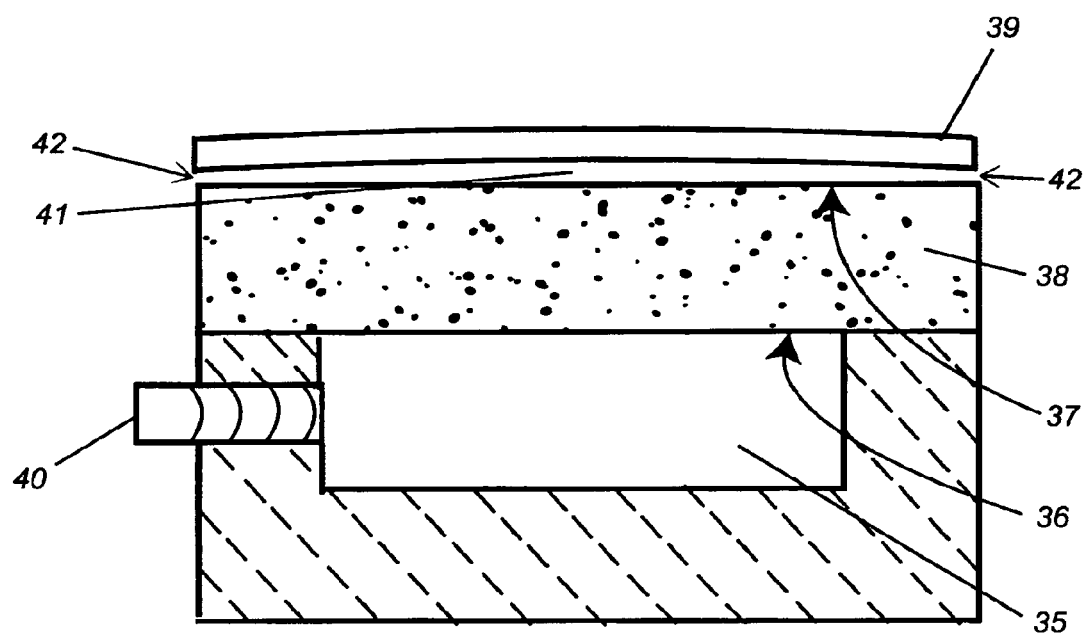
FIG. 7 is a side view of the embodiment of FIG. 6, where the glass is shown to be shaped by the air blowing through the mandrel and against the glass sheet.

FIG. 6 shows a fourth embodiment, which orients the planar surfaces of the workpiece sheet 39 and mandrel 38 in a horizontal plane. In this approach, only one pre-defined mandrel 38 is placed underneath the thermoplastic sheet 39. The mandrel can be either porous or a solid with machined holes and grooves as necessary. The layer 41 of air between the sheet 39 and the mandrel 38 carries the weight of the sheet. The temperature of the furnace (not shown) enclosing this assembly is raised to close to the softening point of the sheet 39. Heated air is introduced into the plenum 35 through the inlet 40. Air enters the porous air-bearing mandrel 38 through surface 36 and exits the mandrel 38 through surface 37. The forces on sheet 39 are a combination of the upward forces from the viscous air flow in the gap 41 and the downward load of the sheet 39. The pressure at the edges 42 of the mandrel is atmospheric. This configuration typically results in curved sheets as shown in FIG. 7. This is because the supply pressure is present at the center of the mandrel and sheet, while the edges are at lower, atmospheric pressure. The pressure due to the force of gravity on the sheet is uniform over its area. Thus, the forming force downward, which is the sum of the force of gravity downward and the force from the fluid bearing upward, is larger downward at the edges, and thus the edges are forced downward to a greater extent than is the middle, thus resulting in a curved sheet. When the specified shape is obtained by the sheet, the furnace temperature is reduced until the sheet is solidified and removed. A finite element analysis incorporating the pressure forces from the viscous air on the sheet 39 and the load of the sheet 39 can be performed to predict the final shape of the sheet.

Figure 8:
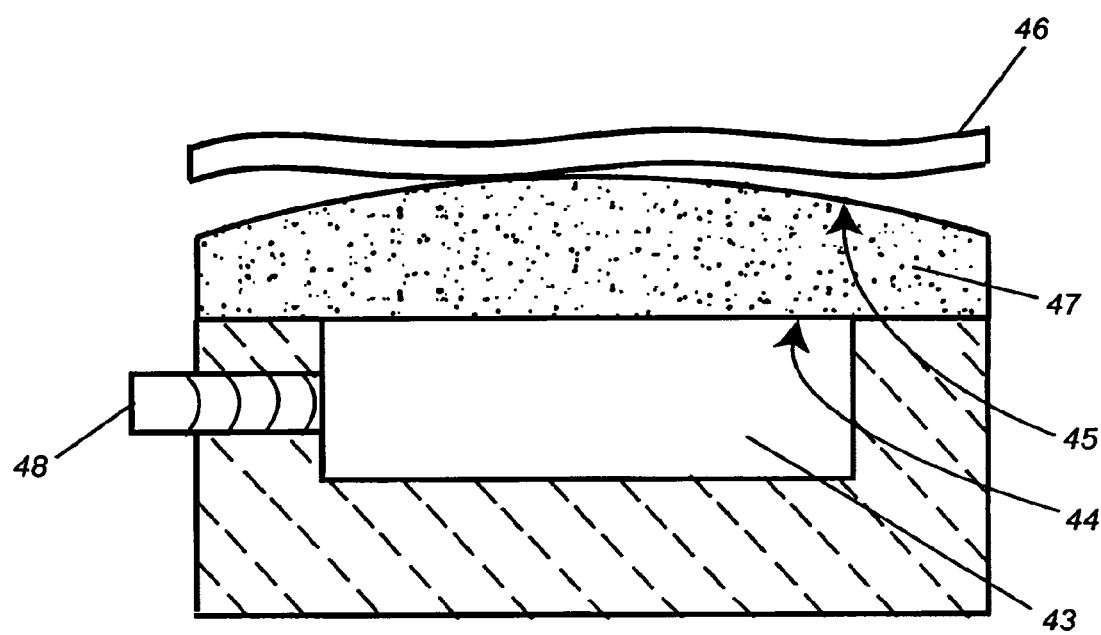
FIG. 8 is a side view of a horizontal configuration of a fifth embodiment of an invention hereof, where a thermoplastic sheet is placed on top of one curved mandrel shown to be convex in this diagram and air blows through the mandrel to shape the thermoplastic sheet after it sags due to its own weight at elevated temperatures.
Figure 9:
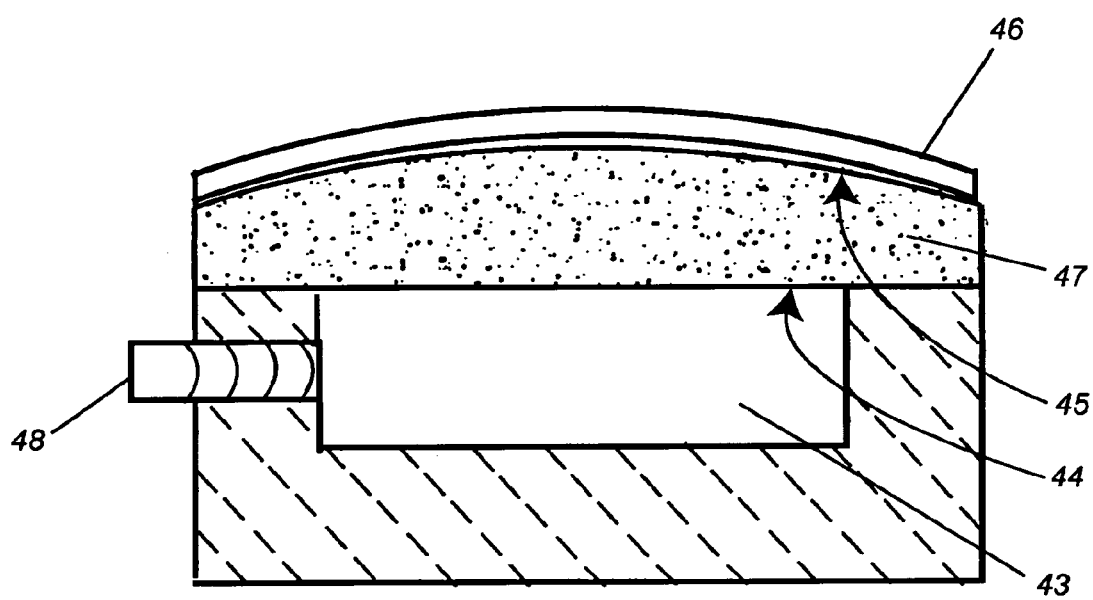
FIG. 9 is a side view of the same embodiment as in FIG. 8, where the glass is shown to be shaped by the air blowing through the mandrel and against the glass sheet.

FIG. 8 shows a fifth embodiment, which places the sheet and a curved air-bearing mandrel with its major surface substantially in a horizontal plane. This configuration can be used when large sheet curvature is desired. The mandrel 47 is ground and lapped to the curvature required. The sheet 46 is placed on top of the mandrel. When cold, only a small area of the sheet 46 as at the central portion is in contact with the mandrel 47. Air flows into the plenum 43 through inlet 48, and into the mandrel 47 through the surface 44, exiting the mandrel through the surface 45. The initial contact area is not large enough for the viscous forces to lift the sheet when it is cold. As the temperature of the furnace is increased, to close to the softening point of the sheet, the sheet 46 softens and starts slumping due to its own weight. As the sheet surface comes closer to the curved mandrel surface 45, the forces from the viscous air flow become prominent and increase as the gap thickness between the sheet 46 and the mandrel 47 decreases. As the air flow force increases, the sheet lifts so that it does not contact the mandrel, as shown in FIG. 9. When the desired shape is obtained by the sheet, the furnace temperature is reduced until the sheet is solidified and removed.

Figure 10:
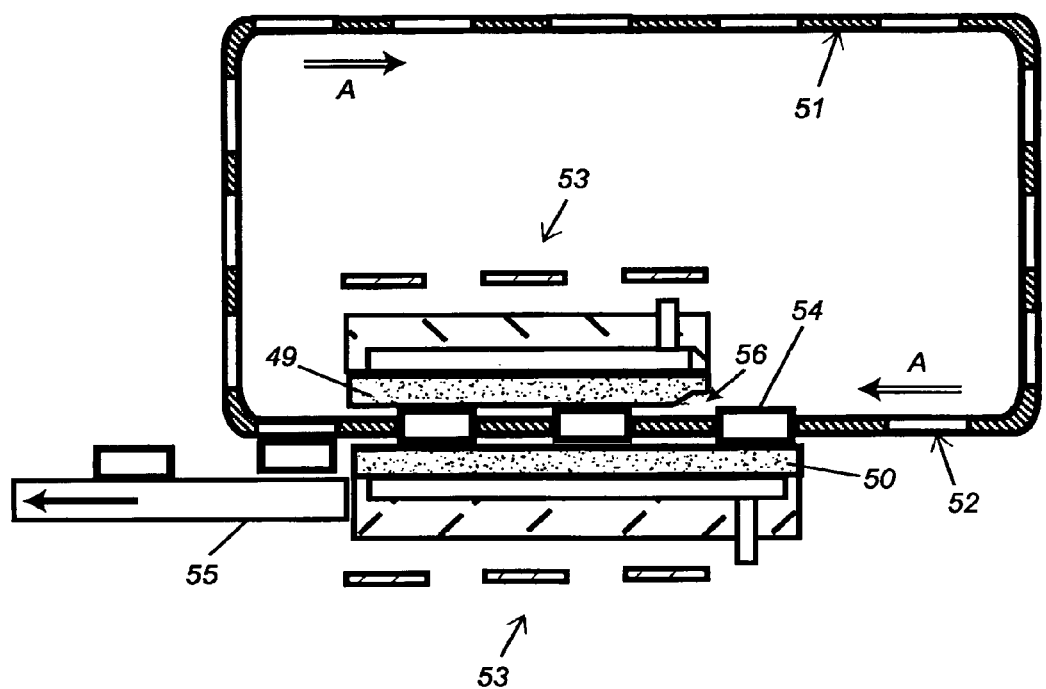
FIG. 10 is a side view of an embodiment of an invention hereof, shaping discrete sheets in a continuous fashion.

FIG. 10 shows a sixth embodiment, which processes and flattens individual sheets forced between two mandrels for shaping in a continuous manufacturing process. A further advantage of this embodiment is that the entire area of each sheet can be shaped to good tolerance without loss of edge areas, which, in other embodiments may lie outside of the air bearing or be in contact with holding mechanisms during processing. Individual sheets of any geometry are shaped one after the other by air squeezed between the sheet and two mandrels on each side of the sheet in a continuous process. A continuous, or endless, conveyor belt 51 of refractory material, such as stainless steel, with slots 52 moves the plurality of discrete substrate sheets through the heated mandrels 49, 50. The thickness of the conveyor 51 is smaller than the thickness of the sheets 54. The slots in the conveyor belt are designed to constrain the lateral motion of the sheets. A loading mechanism (not shown) places preheated solid sheets 54 in a slot of the belt at the position before entry between the mandrels 49, 50 (on the right, as shown). The lower mandrel 50 acts as an air bearing carrying the gravity load of the sheets. The conveyor belt moves this sheet, which is now floating on the layer of air from the lower air bearing, in the direction of arrows A, and introduces it into the area between the two mandrels 49, 50 where heated air flows through the mandrels 49, 50 and against the sheet to shape it. The tapered entrance 56 facilitates squeezing the sheet between the two air bearings. Heaters 53 are used to control the temperature of the mandrels and sheet as the sheet passes between the mandrels. The sheet temperature is raised to close to its softening point at the entry and cooled back to solid state at the exit. This guarantees that the shaped sheet does not lose its final shape, and that it solidifies before leaving the mandrels. After coming out of the mandrel area, the now shaped sheet is removed from the ribbon either by a mechanical arm (not shown) or by allowing it to drop to another conveyor belt 55 at a lower level to transport it away for further processing as necessary.

Various embodiments of inventions hereof have been shown, in which a sheet of thermoplastic material is formed in the presence of a fluid bearing between at least one surface of the sheet and a surface of a mandrel. In some circumstances, the sheet is oriented perfectly vertically, and is supported against gravity by means other than force that derives from the fluid bearing (such as is shown generally in FIG. 4). In the case of FIG. 4, an important function that the fluid bearing provides is to maintain the sheet spaced away from the mandrel, so that no physical contact of the sheet to the mandrel occurs. In fact, in all embodiments shown, the fluid bearing provides this function of spacing the sheet away from the mandrel without contact. According to other embodiments, the sheet is oriented perfectly, or nearly perfectly horizontally, such that one of its surfaces faces a mandrel surface that is gravitationally below the sheet, and, but for the presence of the fluid bearing, the sheet would contact the mandrel surface. FIGS. 8 and 9 show an embodiment of this sort, where the formed sheet is not flat, but is curved. In this type of case, the fluid bearing serves, in part, to support the sheet against the force of gravity which forces the sheet down into contact with the mandrel. Thus, the fluid bearing suspends the sheet away from (in this case, above) the mandrel surface so that no contact arises therebetween. It is not shown, but there might also be spacers located at locations around the surface of the sheet, to keep it spaced initially from the mandrel, or during times of no fluid flow. When the sheet is heated, and begins to slump, the fluid flow keeps the slumping sheet material from contacting the mandrel surface at locations that would otherwise slump downward in the softened state. And finally, there may be embodiments, not shown, where the forming sheet is oriented at an oblique angle to gravity, such that a perpendicular line to the sheet's surface has components that are both horizontal and vertical, with respect to gravity. Such embodiments may form a continuous ribbon of thermoplastic material, as shown in FIG. 4, discrete substrates, as shown in FIG. 8, or a stream of discrete substrates, as shown in FIG. 10. In such cases, the flowing fluid will serve to suspend or support the sheet against the force of gravity that forces it toward the lower mandrel. It will also serve to provide the forces that are used to flatten the sheet.

It should also be noted that, rather than backing up a sheet against the force of gravity, or the force of a fluid bearing on the obverse side of the sheet, a fluid bearing may also be used to back up a sheet against force provided by a conventional contact-type forming mold, which might be used in cases where one side of a formed sheet can tolerate the surface conditions imparted by such a contact forming method, where a mold contacts the obverse face of the sheet.

An important embodiment of an invention disclosed herein is a method for shaping a thermoplastic material workpiece to a specified shape, having a softening point and at least one surface. The method comprises: supporting a workpiece of the thermoplastic material so that the at least one surface is spaced away from a mandrel having a shaped surface; flowing a fluid across the workpiece surface; establishing a pressure profile across the workpiece surface; heating the workpiece to a temperature close to the softening point; waiting until the workpiece conforms to the specified shape; and cooling the workpiece below the softening point so that it retains the specified shape.

According to important related embodiments, the specified shape may conform to the shaped mandrel surface. Or, the specified shape may differ from the shaped mandrel surface, but bear some relationship thereto.

For a related advantageous embodiment, the pressure profile is configured to maintain the workpiece surface spaced from the mandrel, and in many cases, the pressure profile is configured to maintain substantially every point of the workpiece surface equidistant from the mandrel surface.

For preferred embodiments, the fluid may comprise gas, such as air, or it may be a liquid.

According to one preferred embodiment, the flow of fluid is provided by a fluid bearing at the surface of the workpiece, and the fluid bearing may be at one or two surfaces of the workpiece.

If there are two fluid bearings, each may advantageously establish a pressure profile across the respective workpiece surface, such that the flow of fluid under pressure on a first surface of the workpiece applies force to the workpiece, which force presses the workpiece against the fluid flowing across the second surface of the workpiece.

According to a useful embodiment, the workpiece is oriented such that a line that is perpendicular to one surface is horizontal. Or, the workpiece may be oriented such that a line that is perpendicular to one surface is vertical, or such a perpendicular may have a horizontal component and a vertical component.

For an embodiment where the workpiece is oriented such that a line that is perpendicular to one surface has a component that is vertical, the pressure profile can be arranged to support at least part of the weight of the workpiece against gravity.

According to still another useful embodiment the workpiece may be a single, or a plurality of discrete substrates of the thermoplastic material. Alternatively, the workpiece may advantageously be a substantially continuous body of the thermoplastic material.

A related important embodiment of an invention hereof is an apparatus for shaping a workpiece of a thermoplastic material from which a finished article having a perimeter dimension and a specified surface shape is to be made, the workpiece having at least one surface and the material having a softening point. The apparatus comprises: a heater, operative to heat a workpiece of the thermoplastic material to a temperature close to its softening point, and a support, configured to support a softened workpiece, such that all surfaces are spaced away from and free of contact with any other physical object over an expanse as large as that of the finished article. The apparatus further includes a fluid flow director, arranged to direct flowing fluid adjacent at least one surface of a softened workpiece for a period of time sufficient to allow the workpiece to conform to the specified surface shape.

With an important embodiment of an apparatus of an invention hereof, the fluid flow director may comprise a liquid flow director, arranged to direct a flowing liquid. Or, it may comprise a gas flow director, arranged to direct a flowing gas.

Another embodiment of an apparatus of an invention hereof further comprises a cooler, arranged to cool the workpiece.

Apparatus embodiments may also include a plurality of compression clamps to hold the workpiece against the force of gravity, which clamps may each be a heat resistant spacer pair forced against two opposing surfaces of the workpiece.

For many useful embodiments, the workpiece may be arranged with at least one surface generally parallel to a horizontal plane, and the support may comprise a mandrel having a supporting surface arranged generally parallel to the horizontal plane, gravitationally beneath the workpiece, such that the flowing fluid flows between the mandrel surface and the softened workpiece.

For some useful embodiments, the mandrel support surface is a substantially flat surface. For others, it is a non-flat curved surface.

The fluid flow director may be a fluid bearing adjacent at least one surface of the workpiece, for instance, two surfaces.

A very important and preferred embodiment of an apparatus invention hereof uses air as the fluid, and the fluid bearing is a porous air bearing. The bearing may also be a compensated bearing.

For yet another apparatus embodiment of an invention hereof, the apparatus works upon a plurality of discrete substrates of the thermoplastic material and the apparatus further comprises a conveyor that moves an individual substrate element to be adjacent the fluid flow director, and then away therefrom.

And, for still another important apparatus embodiment of an invention hereof, the workpiece is a substantially continuous ribbon of the thermoplastic material, while the apparatus further includes a ribbon transport mechanism.

The forms of the invention shown and described herein represent illustrative embodiments and certain modifications thereof. It is understood that various changes may be made without departing from the spirit of the invention as defined in the claimed subject matter that follows.

Many techniques and aspects of the inventions have been described herein. The person skilled in the art will understand that many of these techniques can be used with other disclosed techniques, even if they have not been specifically described in use together. For instance, many of the methods and apparatus shown used forming planar sheets can be used to form non-planar sheets or sheets with complex curvature. The mechanical sheet clamping and transport mechanisms can be alone or in combination, and in combination with any sort of fluid bearing, to support the softened sheet against the force of gravity. A fluid bearing can be on one or both sides of the sheet, and can be used for forming the sheet shape on one or both sides of the sheet. More than one type of fluid can be used in the same operation. Mechanisms shown and techniques discussed in connection with discrete and stationary apparatus can be used with continuous or moving apparatus, if appropriate. Mandrel pairs can be flat or shaped, and either configuration may be used with the forming surfaces substantially horizontal, substantially vertical, or angled to either.

This disclosure describes and discloses more than one invention. The inventions are set forth in the claims of this and related documents, not only as filed, but also as developed during prosecution of any patent application based on this disclosure. The inventors intend to claim all of the various inventions to the limits permitted by the prior art, as it is subsequently determined to be. No feature described herein is essential to each invention disclosed herein. Thus, the inventors intend that no features described herein, but not claimed in any particular claim of any patent based on this disclosure, should be incorporated into any such claim.

Some assemblies of hardware, or groups of steps, are referred to herein as an invention. However, this is not an admission that any such assemblies or groups are necessarily patentably distinct inventions, particularly as contemplated by laws and regulations regarding the number of inventions that will be examined in one patent application, or unity of invention. It is intended to be a short way of saying an embodiment of an invention.

An abstract is submitted herewith. It is emphasized that this abstract is being provided to comply with the rule requiring an abstract that will allow examiners and other searchers to quickly ascertain the subject matter of the technical disclosure. It is submitted with the understanding that it will not be used to interpret or limit the scope or meaning of the claims, as promised by the Patent Office's rule.

The foregoing discussion should be understood as illustrative and should not be considered to be limiting in any sense. While the inventions have been particularly shown and described with references to preferred embodiments thereof, it will be understood by those skilled in the art that various changes in form and details may be made therein without departing from the spirit and scope of the inventions as defined by the claims.

The corresponding structures, materials, acts and equivalents of all means or step plus function elements in the claims below are intended to include any structure, material, or acts for performing the functions in combination with other claimed elements as specifically claimed.

Having described the invention, what is claimed is:

1. A method for shaping a thermoplastic material workpiece to a specified shape, having a softening point and at least one surface, the method comprising:
   supporting a workpiece of the thermoplastic material so that the at least one surface is spaced away from a mandrel having a shaped surface, the shape of which surface bears a relationship to the specified shape, thereby establishing a gap between the workpiece and the surface;
   flowing a fluid across the workpiece surface, establishing a predominantly viscous flow in the gap, which flow establishes a pressure profile across the workpiece surface such that force from the pressure inversely depends on the size of the gap;
   heating the workpiece to a temperature close to the softening point;
   while maintaining the fluid flowing across the workpiece surface such that the workpiece remains spaced away from the shaped surface, waiting until the workpiece conforms to the specified shape, due to the mandrel shaped surface and the fluid pressure profile;
   cooling the workpiece below the softening point so that it retains the specified shape.

2. The method of claim 1, the specified shape conforming to the shaped mandrel surface.

3. The method of claim 1, the pressure profile configured to maintain the workpiece surface spaced from the mandrel.

4. The method of claim 3, the pressure profile configured to maintain substantially every point of the workpiece surface equidistant from the mandrel surface.

5. The method of claim 1, the fluid comprising a gas.

6. The method of claim 5, the gas comprising air.

7. The method of claim 1, the fluid comprising a liquid.

8. The method of claim 1, wherein the flow of fluid is provided by a fluid bearing at the surface of the workpiece.

9. A method for shaping a thermoplastic material workpiece to a specified shape, having a softening point and at least one surface, the method comprising:
   supporting a workpiece of the thermoplastic material so that the at least one surface is spaced away from a mandrel having a shaped surface;
   flowing a fluid across each of two surfaces of the workpiece;
   establishing a pressure profile across the workpiece surfaces that establishes a fluid bearing;
   heating the workpiece to a temperature close to the softening point;
   waiting until the workpiece conforms to the specified shape; and
   cooling the workpiece below the softening point so that it retains the specified shape.

10. The method of claim 9, each fluid bearing establishing a pressure profile across the respective workpiece surface, such that the flow of fluid under pressure on a first surface of the workpiece applies force to the workpiece, which force presses the workpiece against the fluid flowing across the second surface of the workpiece.

11. The method of claim 10, the workpiece oriented such that a line that is perpendicular to one surface is horizontal.

12. The method of claim 10, the workpiece oriented such that a line that is perpendicular to one surface is vertical.

13. The method of claim 10, the workpiece oriented such that a line that is perpendicular to one surface has a horizontal component and a vertical component.

14. The method of claim 10, the workpiece oriented such that a line that is perpendicular to one surface has a component that is vertical, the pressure profile further being arranged to support at least part of the weight of the workpiece against gravity.

15. The method of claim 1, wherein the workpiece comprises a plurality of discrete substrates of the thermoplastic material.

16. The method of claim 1, wherein the workpiece comprises a substantially continuous body of the thermoplastic material.

* * * * *